B. E. D. STAFFORD & E. I. DODDS.
STAY BOLT STRUCTURE.
APPLICATION FILED NOV. 21, 1916.
1,252,309.
Patented Jan. 1, 1918.
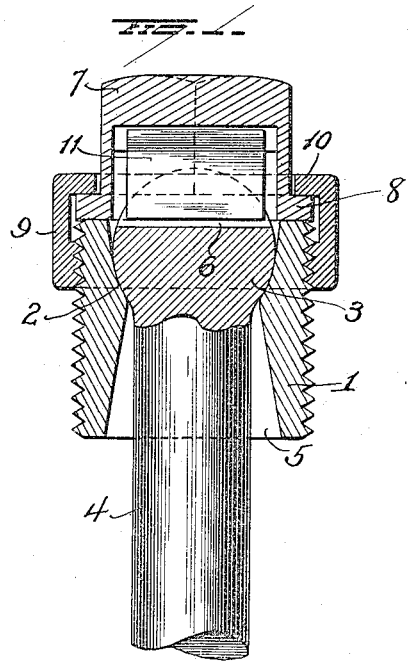
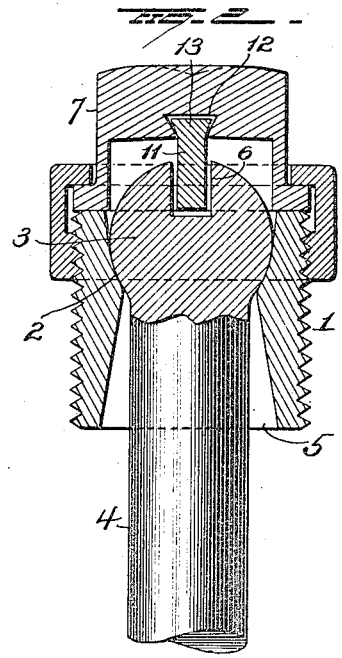
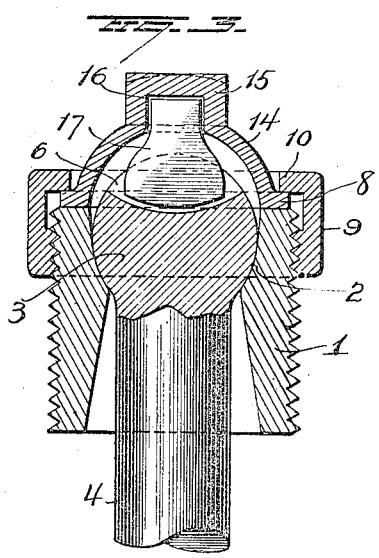
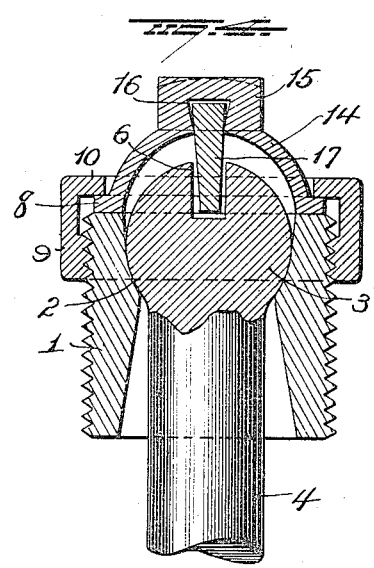
WITNESSES
INVENTORS
B. E. D. Stafford and
E. I. Dodds
By Seymour & Bright
Attorneys

UNITED STATES PATENT OFFICE.

BENJAMIN E. D. STAFFORD AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT STRUCTURE.

1,252,309.  Specification of Letters Patent.  Patented Jan. 1, 1918.

Application filed November 21, 1916. Serial No. 132,595.

*To all whom it may concern:*

Be it known that we, BENJAMIN E. D. STAFFORD and ETHAN I. DODDS, citizens of the United States, and residents of Pittsburgh, in the county of Allegheny and State of Pennsylvania, have invented certain new and useful Improvements in Stay-Bolt Structures; and we do hereby declare the following to be a full, clear, and exact description of the invention, such as will enable others skilled in the art to which it appertains to make and use the same.

This invention relates to improvements in stay bolt structures, and more particularly to mechanical means for testing the integrity of the bolt,—the object of the present invention being to provide simple and efficient means which shall be coöperable with the head of the bolt in a flexible stay bolt structure, to permit the condition of the bolt to be ascertained without removing any part of the structure.

With this object in view, the invention consists in certain novel features of construction and combinations of parts as hereinafter set forth and pointed out in the claims.

In the accompanying drawings, Figure 1 is a sectional view showing a stay bolt structure embodying our improvements; Fig. 2 is a sectional view taken at right angles to Fig. 1, and Figs. 3 and 4 are sectional views showing a modified construction.

1 represents a bearing sleeve threaded exteriorly for connection with an outer boiler sheet, as is well understood. The sleeve is provided interiorly with a bearing 2 for the rounded head 3 of a stay bolt 4 and with a flaring bore 5 to permit lateral movement of the bolt. The head of the bolt may be provided with a recess 6 which, in the embodiment of the invention shown in the drawings, may be made rectangular in cross-section.

A rotary driving member 7 is mounted upon the outer end of the bearing sleeve 1. This rotary member is made angular in form to receive a wrench and it is provided with an annular flange 8 seated against the end of the bearing sleeve. A cap or collar 9 is screwed on the bearing sleeve 1, and this cap or collar is provided at its outer edge with an inwardly projecting annular flange 10 which overlies the flange 8 of the rotary member 7, and thus said rotary member is connected with the bearing sleeve.

The rotary member 7 is intended to act as supporting and driving means for a tongue or key 11, and for this purpose, the said member 7 is provided interiorly with a dove-tailed recess 12 in which the dove-tailed upper edge 13 of the tongue or key 7 is freely disposed. The tongue or key 7 is thus hung within the driving member 7 and it is of sufficient dimensions to depend into the recess 6 in the bolt head, but sufficiently smaller than said recess as not to interfere with the normal lateral play of the bolt.

Normally, the member 7 may be held tight by means of the cap or collar 9, but when it is desired to test the bolt, the attendant may loosen said collar and then, with the use of a wrench applied to the angular body of said member 7, he may attempt to turn the same. If the rotary member 7 refuses to turn farther than may be permitted by the loose fit of the tongue or key in the slot in the bolt head, the attendant will know that the bolt is good, but if said rotary member turns freely, this fact will indicate that the bolt is broken.

In the form of the invention shown in Figs. 3 and 4, the rotary driving member is made in the form of a hollow partly spherical cap 14 provided with an angular enlargement 15 on its top to receive a wrench,—said cap being provided with an angular flange 8 held to the sleeve 1 by means of the flange 10 on cap or collar 9, as in the construction shown in Figs. 1 and 2. The enlargement 15 is made with a dove-tailed recess 16 to receive the contracted outer portion of a wedge-shaped tongue or key 17,—the broader inner end of the latter entering the recess in the bolt head. The operation of this form of the invention is the same as that described in connection with Figs. 1 and 2.

We do not claim broadly, in this case, a testing member to engage the bolt and mounted to be turned to test the integrity of the bolt, the same being covered in our copending application Serial No. 83,146, nor do we claim broadly in this case, the testing member having a port disposed within the cap and operatively associated with the bolt, and a part projecting through the cap, the same being covered in our copending application, Serial No. 130,047.

Having fully described our invention what we claim as new and desire to secure by Letters-Patent, is:—

1. The combination with a bearing sleeve and a bolt having a head mounted in said sleeve, of a rotary member, means connecting said rotary member with the sleeve, said rotary member and bolt head having recesses, and a separate tongue or key mounted in the recess in one of said parts and entering the recess in the other part.

2. The combination with a bearing sleeve and a bolt having a head mounted in said sleeve and provided with a recess, of a rotary member having an interior dove-tailed recess, and a tongue having a part loosely mounted in the dove-tailed recess and entering the recess in the bolt head.

In testimony whereof, we have signed this specification in the presence of two subscribing witnesses.

BENJAMIN E. D. STAFFORD.
ETHAN F. DODDS.

Witnesses:
EDWIN SPENCER RYCE,
F. H. ALLISON.

Copies of this patent may be obtained for five cents each, by addressing the "Commissioner of Patents, Washington, D. C."